(12) United States Patent
Poulsen

(10) Patent No.: US 7,123,411 B2
(45) Date of Patent: Oct. 17, 2006

(54) REFLECTIVE MULTI-IMAGE SURFACE

(75) Inventor: Peter D. Poulsen, Grants Pass, OR (US)

(73) Assignee: Merlin Technology Limited Liability Company, Grants Pass, OR (US)

( * ) Notice: Subject to any disclaimer, the term of this patent is extended or adjusted under 35 U.S.C. 154(b) by 0 days.

(21) Appl. No.: 10/993,420

(22) Filed: Nov. 18, 2004

(65) Prior Publication Data

US 2005/0134981 A1 Jun. 23, 2005

Related U.S. Application Data

(60) Provisional application No. 60/523,006, filed on Nov. 18, 2003.

(51) Int. Cl.
*G03B 21/60* (2006.01)

(52) U.S. Cl. ..................................... 359/459

(58) Field of Classification Search ................ 359/459, 359/546; 353/99, 7
See application file for complete search history.

(56) References Cited

U.S. PATENT DOCUMENTS

| 3,994,562 A | 11/1976 | Holzel |
| 4,006,965 A | 2/1977 | Takada et al. |
| 4,022,522 A | 5/1977 | Rain |
| 4,025,160 A | 5/1977 | Martinez |
| 4,040,717 A | 8/1977 | Cinque et al. |
| 4,068,922 A | 1/1978 | Dotsko |
| 4,089,587 A | 5/1978 | Schudel |
| 4,190,320 A | 2/1980 | Ferro |
| 4,191,451 A | 3/1980 | Hodges |
| 4,206,969 A | 6/1980 | Cobb et al. |
| 4,235,513 A * | 11/1980 | Vlahos ........................ 359/459 |
| 4,297,001 A | 10/1981 | Antes et al. |
| 4,298,246 A | 11/1981 | Iwamura |
| 4,458,251 A * | 7/1984 | Bondon ....................... 343/914 |
| 4,606,609 A | 8/1986 | Hong |
| 4,767,186 A | 8/1988 | Bradley, Jr. et al. |
| 4,911,529 A | 3/1990 | Van De Ven |
| 5,112,121 A * | 5/1992 | Chang et al. .................. 359/22 |
| 5,210,641 A | 5/1993 | Lewis |
| 5,296,965 A | 3/1994 | Uetsuki et al. |
| 5,335,022 A | 8/1994 | Braun et al. |
| 5,581,605 A * | 12/1996 | Murakami et al. .......... 359/619 |
| 5,625,489 A | 4/1997 | Glenn |
| 6,040,491 A | 3/2000 | Sjowall |

(Continued)

OTHER PUBLICATIONS

"International Search Report," PCT/US04/39385, Jan. 5, 2006, 3 pgs.

(Continued)

*Primary Examiner*—Gregory J. Toatley, Jr.
*Assistant Examiner*—Kara Geisel
(74) *Attorney, Agent, or Firm*—Conley Rose, P.C.; Kristin Jordan Harkins; Michael S. Bush

(57) ABSTRACT

A surface containing a plurality of individually-addressable encoded images comprises an array of curved specular reflectors. Reflectance modifying treatment is applied to a first region of at least one of the curved specular reflectors, such that beamable energy that is directed towards the array is viewable from a first subset of the curved specular reflectors only under a first set of viewing conditions. Reflectance modifying treatment is applied to a second region of at least one of the curved specular reflectors, such that beamable energy that is directed towards the array is viewable from a second subset of the curved specular reflectors only under a second set of viewing conditions.

51 Claims, 22 Drawing Sheets

U.S. PATENT DOCUMENTS

| | | |
|---|---|---|
| 6,384,970 B1 | 5/2002 | Abe et al. |
| 6,932,476 B1* | 8/2005 | Sudo et al. .................. 359/462 |
| 2003/0007113 A1* | 1/2003 | Yamanaka et al. .......... 349/113 |
| 2003/0151821 A1* | 8/2003 | Favalora et al. ............ 359/619 |
| 2003/0234909 A1* | 12/2003 | Collender et al. ............. 353/7 |

OTHER PUBLICATIONS

"Written Opinion of the International Searching Authority," PCT/US04/39385, Jan. 5, 2006, 5 pgs.

* cited by examiner

FIG. 1H
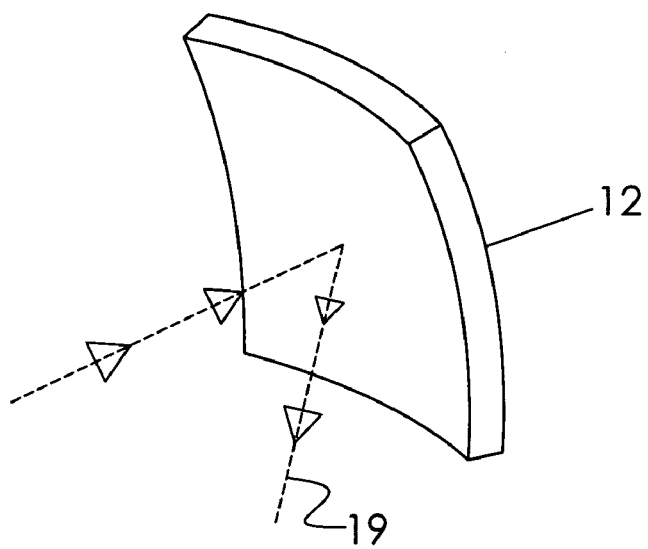
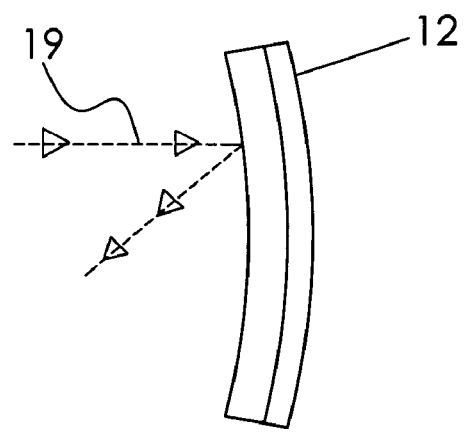
FIG. 1I

REFLECTIVE MULTI-IMAGE SURFACE

CROSS-REFERENCE TO RELATED APPLICATIONS

This application claims the benefit of U.S. Provisional Application No. 60/523,006, filed on Nov. 18, 2003. This application is related to a U.S. application Ser. No. 10/993,423 filed on Nov. 18, 2004, titled "Variable Optical Arrays and Variable Manufacturing Methods". This application is related to U.S. application Ser. No. 10/961,834 titled "Projection-Receiving Surface That Functions in Strong Ambient Light" filed on Oct. 7, 2004.

FIELD OF THE INVENTION

The present invention relates generally to surfaces for viewing reflected light or other types of beamable energy. More specifically, the present invention relates to advertising signage, retail packaging, road-way signage and markers, novelty surfaces for notebooks and toys, theatrical effects, navigation, and interior and exterior wall coverings.

BACKGROUND OF THE INVENTION

This invention is a surface that can simultaneously contain hundreds of individually-addressable encoded images. This surface has advantages for advertising signage, retail packaging, road-way signage and markers, novelty surfaces for notebooks and toys, theatrical effects, navigation, interior and exterior wall coverings, and other applications.

This invention makes use of a reflective surface that is strongly specular and which is curved in a manner that yields spatial gain relative to a diffuse reflector. This invention takes advantage of the localized nature of glint off of such a curved specular reflector. The characteristic of a diffuse reflector is that it scatters a beam of light over a great portion of the hemisphere in front of the illuminated surface and does not demonstrate localized glint. A piece of paper and a movie screen are examples of diffuse reflectors. In comparison, a specular surface reflects a beam of light into a more limited portion of the same hemisphere. A specular reflection is typically included in a small angular region surrounding the line that is at an equal angle, but when referenced to the reflector surface's normal is oppositely signed, to the angle of impinging light. A household mirror and a polished chrome automobile bumper are examples of specular reflectors.

Limitation in direction of reflection, that is, containing the reflected light to within a smaller spatial expanse than characteristic of diffuse surfaces, can provide a "spatial-gain" which suggests a reflectance that exceeds the reflectance possibility of any diffuse surface. This is true as long as the solid angles that encompass the possible positions of observation and illumination are limited to solid angles less than a complete hemisphere.

Understanding of this invention is assisted by comparing a white-painted flat surface with the specialized case of a flat mirror. (This special case is for concept elucidation only and is not otherwise necessarily related to the claims of this invention.) If a flat, diffuse, white-painted object is held in the sunlight, an observer sees light reflected from its surface over a large extent of viewing angles, nominally the entire hemisphere in front of the object. Therefore, when such an object is rotated, light from it can be seen over a wide range of angular movement.

However, if a flat specular mirror is considered under the same conditions, then nothing is seen except within a small angular region where the mirror directs a great flash to the eye of the observer. The flash comes from reflection simultaneously off of a large region of the flat mirror, if not off the entirety of the mirror. The flash within this narrow angular condition can easily be thousands of times brighter than when the same incident sunlight is reflected from the white paint.

If the flat specular mirror's surface is altered by giving it purposeful curvature, then the angular extent on the curved mirror within which the flash is observable increases, though the intensity decreases. But even the decreased brightness is still many times greater than the whitest flat paint or other diffuse reflector. The ratio of brightness is the "gain" of the reflectance surface. Also unlike the flat mirror, the specular reflection of a light source, artificial or sunlight, comes only from a small region of the curved mirror, termed the glint spot. This feature further differentiates this invention's surface from the flat mirror, and it sets up a condition for multi-image encoding. This invention utilizes an array of compound surface with the aforementioned effects of curved specular mirrors not only for brightness, but also for presentation of multiple encoded images. Each element cell of the array ensemble is a small mirror in itself, termed herein a "mirrorlette." The reflection of glint can be modified for each location on each of the mirrorlettes in such a manner as to produce an image and/or optical effect that is the summation of contributions from all or part of the array of mirrorlettes.

SUMMARY OF THE INVENTION

An aspect of the present invention is to provide an array of curved specular reflectors to which reflectance modifying treatment has been applied, such that impinging light or other beamable energy is differentially reflected from the array, creating images that vary as viewing conditions are changed. Changes in conditions include the position and type of light applied and the position of the viewer relative to the surface, as well as the type of light.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 1H and 1I show a single concave mirrorlette; FIG. 1H shows the concave mirrorlette in perspective, while FIG. 1I shows the mirrorlette from the side;

FIG. 2C shows the array in perspective view, while FIG. 2D shows the array from the side, with the left side of FIG. 2D being the surface on which light impinges;

FIG. 2E shows the array in perspective view, while FIG. 2F shows the array from the side, with the left side of FIG. 2F being the surface on which light impinges;

DETAILED DESCRIPTION OF THE PREFERRED EMBODIMENTS

Figure 1A:
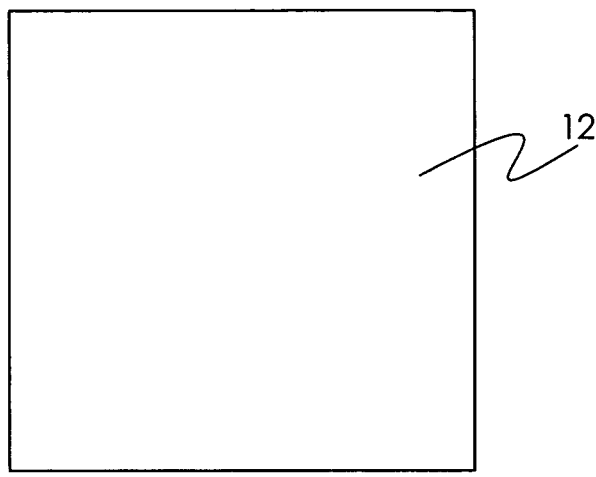
FIGS. 1A and 1B depict an individual mirrorlette viewed from the front and in perspective, respectively.

The following description of the preferred embodiment(s) is merely exemplary in nature and is in no way intended to limit the invention, its application, or uses. This application claims the benefit of U.S. Provisional Application No. 60/523,006, filed on Nov. 18, 2003, which is herein incorporated by reference.

An example surface is an array of small curved specular reflectors which are comparable to mirror segments, or "mirrorlettes," wherein each segment is appropriately curved in accord with desired ranges of observation angle and desired brightness gain. Each mirrorlette is covered at various selected spots with an absorbing and/or scattering material that modifies the specular reflection of the mirror surface at the point of application. Mirrorlettes can made of any specularly reflective material, including, but not limited to, MYLAR sheets or glass, metal or plastic surfaces coated with metals or other materials so as to confer specular reflective properties on the surface. Methods of manufacturing the arrays described herein are described in the co-pending US application filed on Nov. 18, 2004, titled "Variable Optical Arrays and Variable Manufacturing Methods", which is herein incorporated by reference in its entirety.

The spots on individual mirrorlettes are placed and sized in accord with conditions for producing an image when the surface is observed as an entire spatial ensemble of contributions from each mirrorlette. In the context of this application an "image" can mean any combination of modified glint spots, even a single spot in an otherwise unmodified array, that can be perceived upon application of the appropriate type of "beamable energy" (see below) in the presence of the appropriate type of detector under correct viewing conditions. The spots can have various transmissivity, scatter, and color as appropriate to desired ends. In some cases the coatings or other treatments may completely block or scatter the incoming light or other "beamable energy" (see below). In other cases, however, the coatings or other treatments may "differentially reflect" the incoming beamable energy, for example by selectively reflecting only a subset of the wavelengths or other subtypes of the impinging energy source. One nonlimiting example of this latter situation would be in the case of different wavelengths of impinging white light being selectively reflected from the mirrorlettes due to different color-absorbing or color-reflecting coatings being applied to the surfaces, with the result that the ensemble of mirrorlettes depicts one or more multicolor images when viewed under the correct sets of viewing conditions. Other coatings include ink from pens, including pens for writing on plastic overhead projector sheets; ink for applying to MYLAR sheeting; paints, including flat-finish paint; dyes and stains of various kinds; and ink from an inkjet printer.

A "reflectance modifying treatment" also includes the case inverse to diminishing an original surface's specularity and/or spectral reflectance; that is, the term "reflectance modifying treatment" includes adding specularity and/or reflectance to a surface that is not specularly reflective, along with further treatments that reduce the specularity and/or spectral reflectance. Thus, reflection-modifying treatment can be applied to the glint spots on an array of mirrorlettes with diffusely reflective surfaces to create a reflective multi-image surface.

The array of mirrorlettes may be formed as a single piece or by joining numerous elements into a larger array. Several arrays can in turn be joined to form an even larger surface. When the array is exposed to sunlight or another light source where it can be observed from a distance that is large compared to the overall size of the ensemble of mirrorlettes, a small bright glint-spot of the light source will be observed at the same location on each mirrorlette in which the glint-spot is not covered by absorbing or scattering material.

If a light source, solar or artificial, changes location or if the array is rotated relative to the observer, then the location of the glint spots on the mirrorlettes will move to a different location on each of the mirrorlettes. Because the glint spots from the light source are small compared to the size of the mirrorlettes, a different image can be formed for each illumination situation by placing reflection modifiers at appropriate locations for a new image to be seen as the array of glints move in response to the movement of the light source. Likewise, different images can be seen if the light source stays in the same location and the observer moves, thereby causing a movement of the glint spots. Depending on several characteristics (such as angular extent of the light source and the mirrorlette curvature specifics) hundreds of images can be recorded and presented on a single high-reflectance multi-image surface array. (It should be noted that an image does not need to be recognizable per se. For purposes herein, the term "images" includes abstract compositions. Abstract images are anticipated and included in the scope of this invention.) In one embodiment of the invention, multiple images are encoded by coloring lines on a MYLAR-based mirrorlette array. Coloring of the mirrorlettes is guided by a stencil in the shape of the desired object, and mirrorlettes outside of the stencil area are painted with flat black paint. To produce a multi-image surface, only a fraction (for example, one-third) of each mirrorlette is colored or painted for each separate image, with the same region being colored or painted on each mirrorlette to produce a particular image.

If an observer changes radial distance to the reflective array, the glint locations will also change. At longer distances this change will be very slight with radial movement toward or away from the array. However, if the observer approaches the surface more closely, then the glint spots will eventually move considerably faster on each mirrorlette as radial distance changes. Therefore, the reflectance-modifying spots may need to be appropriately enlarged and/or elongated if it is desired that the same image be maintained within a certain range of observer distances. Alternatively, instead of compensating for various viewer distances by enlarging the spots, this distance-dependent glint location property may be exploited to produce new images as a function of observer distance from the array. Thus, an additional attribute of the invention is that the reflectance modifications can be applied such that new images can be seen as the observer approaches the array, even if the observer does not change angle to the overall array itself.

The sun is a readily available nearly collimated "point" source useful for outdoor application of the invention. Clearly, artificial "point" sources of light can be collimated by sufficient distance, or with the use of optics, and used in place of the sun to bring forth images using the principles of the invention. At night or in indoor settings, for example, spotlights can be used to illuminate the surface and bring forth the various images contained in it. If the reflectance-modifying spots are appropriately located relative to the glint locations for a point source of light that is close to the surface, the appearance of many individual images can still be achieved even without collimation.

Also, reflection-modifiers can be located on the surfaces of the mirrorlettes in such a pattern as to form images when illuminated with extended (non-point) sources such as clouds, standard fluorescent tube ceiling lights, or any other source of diffuse light or "beamable energy" (see below). To allow for the larger glint spots made by extended sources, the mirrorlettes can be made larger, thus allowing for larger patches of reflectance-modifying treatment to be applied. In addition, when the surface is illuminated by a sufficiently large extended source, then the treatments of several of the image glint spots may be averaged together on an individual mirrorlette. The selection of individual images, with their associated spot coatings on each mirrorlette, can be designed in such a manner that when the surface is illuminated with an extended source, an image will be produced due to the averaging effect that could not be seen otherwise. In fact, it is possible to design a set of images where the location and size of extended sources will produce images that could not be observed with point (collimated) sources and other extended sources outside of the realm of those locations and sizes for which the image was defined.

It should be noted that this invention includes all forms of curved specular reflector, not just spherical. For purposes herein, the term "curve" includes any series of reflective facets, including a series of flat facets such as on the surface of a geodesic dome, joined to form a curve-like profile. Also, hybrid combinations of specular and diffuse surfacing are included within the scope of this invention. Additionally, this invention includes configurations wherein the spots are not all coatings, but are surface changes in the mirror substrate itself, for example roughness, curvature change, chemically- (as with hydrochloric acid) or mechanically-produced etching, or holes, to name a few possibilities. Also, although for purposes of clarity of explanation the discussion herein concentrates on visual light, the invention includes and anticipates applications for other energies, such as ultraviolet, infrared, radio, sound and other "directable" waves or "beamable" energies that can be specularly reflected. For the purpose of this application, "beamable energies" are those energy sources that can be directed at a target and which exhibit specular reflection properties when encountering appropriate surfaces. These beamable energies may include the various forms of electromagnetic radiation such as visible and non-visible light, radio waves, microwaves, and x-rays, as well as acoustic energies such as ultrasound. The mirrorlette surface materials; coatings and other reflectance-modifying treatments; and detection methods for producing an array of specular reflectors as described herein, using other sources of beamable energy, are well known in the respective fields of art. For example, x-ray telescopes use a form of specular reflection of x-rays. Some minor modifications of the principles described herein would need to be made to achieve comparable results. For example, if the beamable energy were x-rays then the angle of incidence of the beam on the mirrorlette surfaces would need to be very shallow (termed 'grazing'). If sound were the beamable energy then the mirrorlettes would need to be large enough, perhaps several feet across, to be adequately matched to the wavelengths of the sounds employed. Furthermore, sound can be reflected by hard surfaces, such as concrete, which would not necessarily be good reflectors of visible light. Such adaptations are well known in the respective fields of art and are encompassed within the present invention.

Figure 1B:
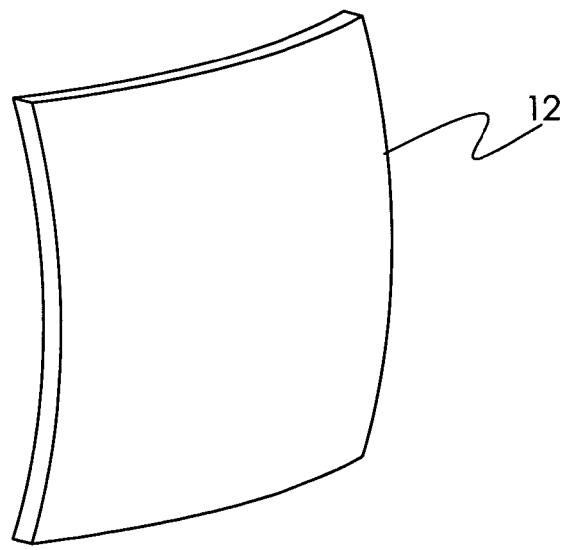
Figure 1C:
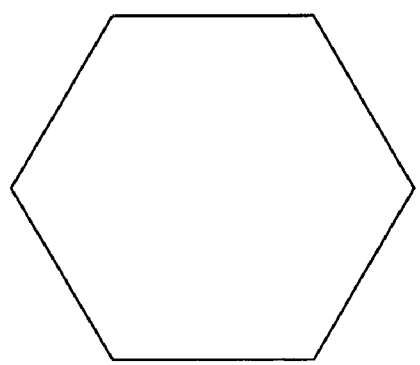
FIGS. 1C–1F show mirrorlettes, viewed from the front, having hexagonal, triangular, rectangular, and oval perimeters, respectively.
Figure 1D:
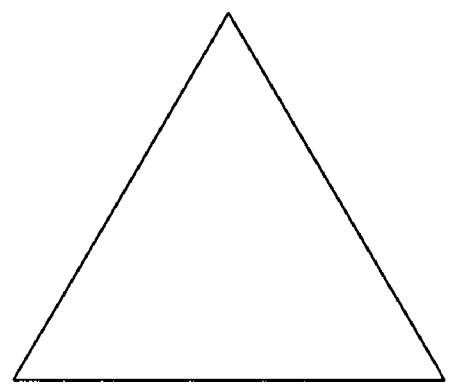
Figure 1E:
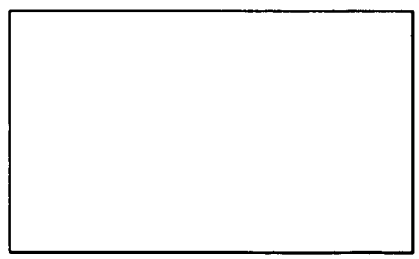
Figure 1F:
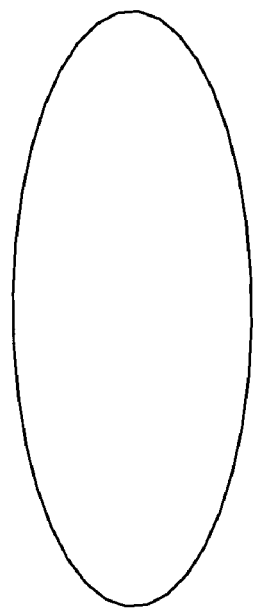
Figure 1G:
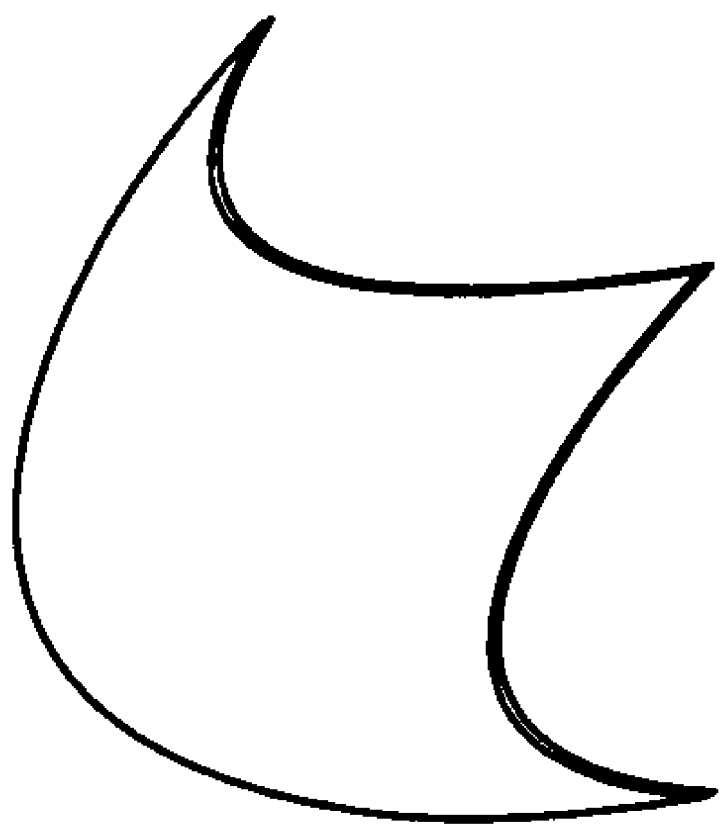
FIG. 1G shows a single mirrorlette, viewed in perspective, having a convex, oval surface profile.
Figure 2A:
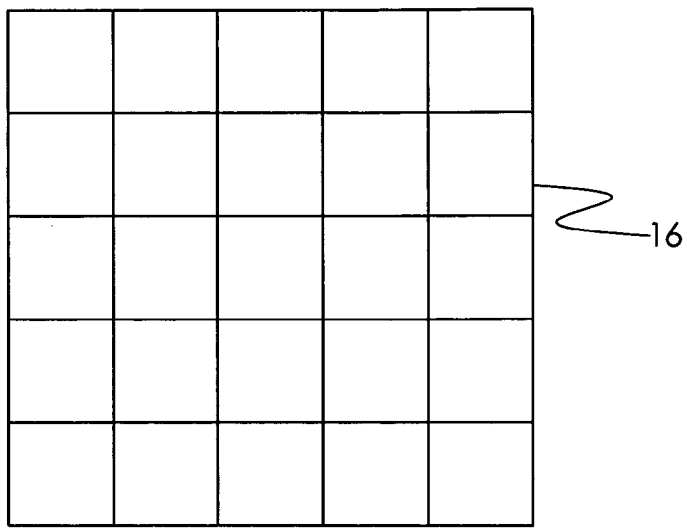
FIGS. 2A and 2B depict an array of mirrorlettes viewed from the front and in perspective, respectively.
Figure 2B:
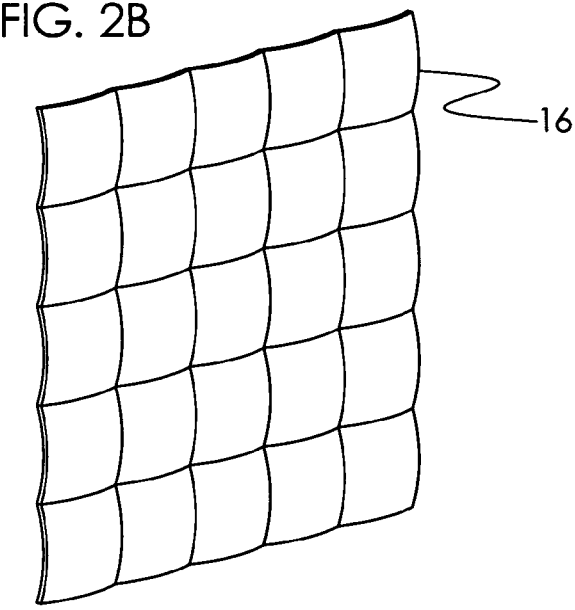
Figure 2C:
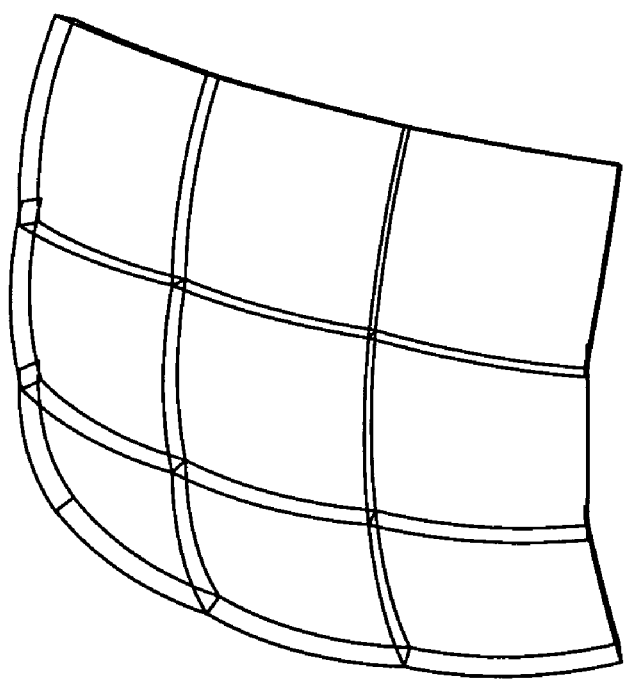
FIGS. 2C and 2D show an array of mirrorlettes arranged in a substantially convex configuration.
Figure 2D:
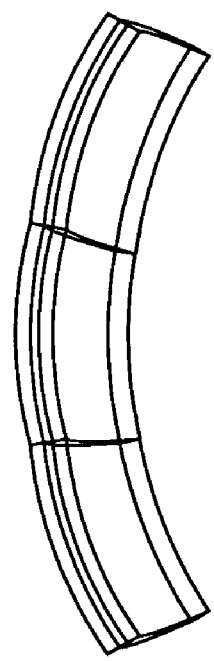
Figure 2E:
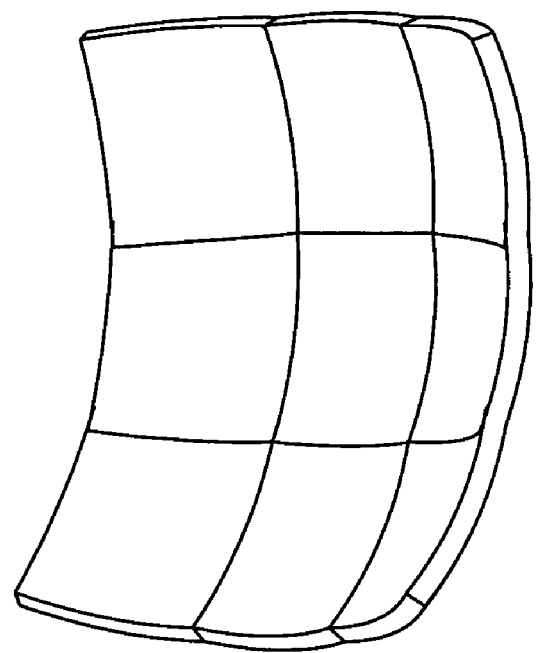
FIGS. 2E and 2F show an array of mirrorlettes arranged in a substantially concave configuration.
Figure 2F:

FIG. 1A shows an individual mirrorlette 12 from the front while FIG. 1B shows mirrorlette 12 in perspective view. Mirrorlette 12 depicted in both parts of FIG. 1 has a spherical profile, wherein the diameter of the underlying sphere is larger than either edge of mirrorlette 12. While mirrorlette 12 is shown in FIG. 1A as having an approximately square perimeter, mirrorlettes may be formed in a variety of shapes including those having rectangular, hexagonal, or triangular perimeters. FIGS. 1C–1F show mirrorlettes, viewed from the front, having hexagonal, triangular, rectangular, and oval perimeters, respectively. In one embodiment, the perimeter edges of a square mirrorlette, such as that shown in FIGS. 1A and 1B, are approximately 3–10 mm, although embodiments with either larger or smaller mirrorlettes are also encompassed within the present invention. In addition, while the surface of mirrorlette 12 as shown in FIG. 1B has a substantially spherical profile, other shapes and profiles are possible, including oval profiles or irregular smooth surfaces as well as polyhedral, multifaceted surfaces, or combinations of several surface profile types. FIG. 1G shows a mirrorlette having a convex, oval surface profile, viewed in perspective. Also encompassed within the present invention are mirrorlettes that are formed with spherical profiles based on spheres of different diameters. In addition, the present invention also encompasses curved specular reflectors that are both convex (as depicted in FIG. 1B) or concave (FIG. 1H, 1I). FIGS. 1H and 1I show a single concave mirrorlette. FIG. 1H shows the concave mirrorlette in perspective, demonstrating an impinging ray 19 striking the surface of mirrorlette 12 and specularly reflecting. FIG. 1I shows the same mirrorlette from the side.

FIG. 2 shows one embodiment for assembling individual mirrorlettes into an array 16. FIG. 2A shows an array of mirrorlettes 16 from the front, while FIG. 2B shows array of mirrorlettes 16 in perspective view. Besides the embodiment shown in FIG. 2, in which square elements are arranged into straight rows and columns, other possible embodiments of packing arrangements are encompassed within this invention, such as square or rectangular mirrorlettes packed in a staggered brickwork-like array or other polygonal shapes arranged into tightly-packed arrays (e.g. packing of hexagonal-shaped elements into a honeycomb pattern). Also encompassed within this invention are arrays of circular or oval mirrorlettes, in which the edges of the circles or ovals may be touching but non-overlapping, or may overlap to varying degrees. In the latter case of a pattern based on a series of overlapping circles or ovals, the resulting mirrorlettes may be a combination of lemon-shaped segments, circles or ovals with one or more lemon-shaped pieces removed, and other irregular shapes arising from the overlap of the circles or ovals. Additionally this invention encompasses arrays of mirrorlettes that are not the same as one another, including combinations of any of the above-mentioned shapes, along with irregularly-shaped curved shapes and any other closed polygonal shape. There is no requirement for the mirrorlette arrays to be tightly-packed: the invention also encompasses arrays wherein the mirrorlettes are arranged with varying amounts of space between each element. Examples of various additional types of mirrorlettes are shown in U.S. application Ser. No. 10/961,834, titled "Projection-Receiving Surface That Functions in Strong Ambient Light" and filed on Oct. 7, 2004, which is herein incorporated by reference in its entirety. Also, the embodiment shown in FIG. 2B shows the array of mirrorlettes as being substantially planar; however, other configurations of the array are possible and are encompassed within the present invention, including, for example, arrays in which the mirrorlettes form a convex or concave surface. FIGS. 2C and 2D show an array of mirrorlettes arranged in a substantially convex configuration. FIG. 2C shows the array in perspective view, while FIG. 2D shows the array from the side, with the left side of FIG. 2D being the surface on which light impinges. FIGS. 2E and 2F show an array of mirrorlettes arranged in a substantially concave configuration. FIG. 2E shows the array in perspective view, while FIG. 2F shows the array from the side, with the left side of FIG. 2F being the surface on which light impinges.

Figure 3A:
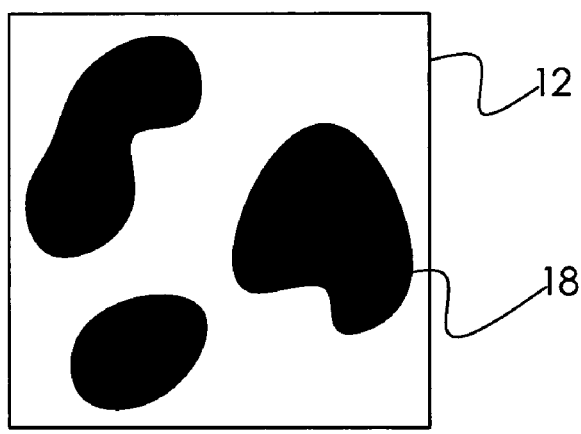
FIGS. 3A and 3B depict an individual mirrorlette with reflectance modifying spots from the front and in perspective, respectively.
Figure 3B:
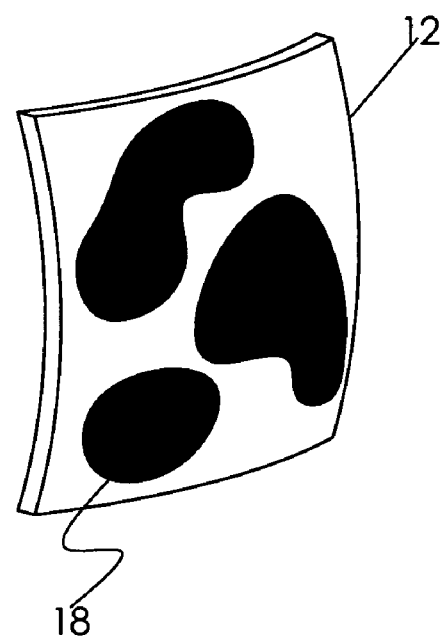
Figure 3C:
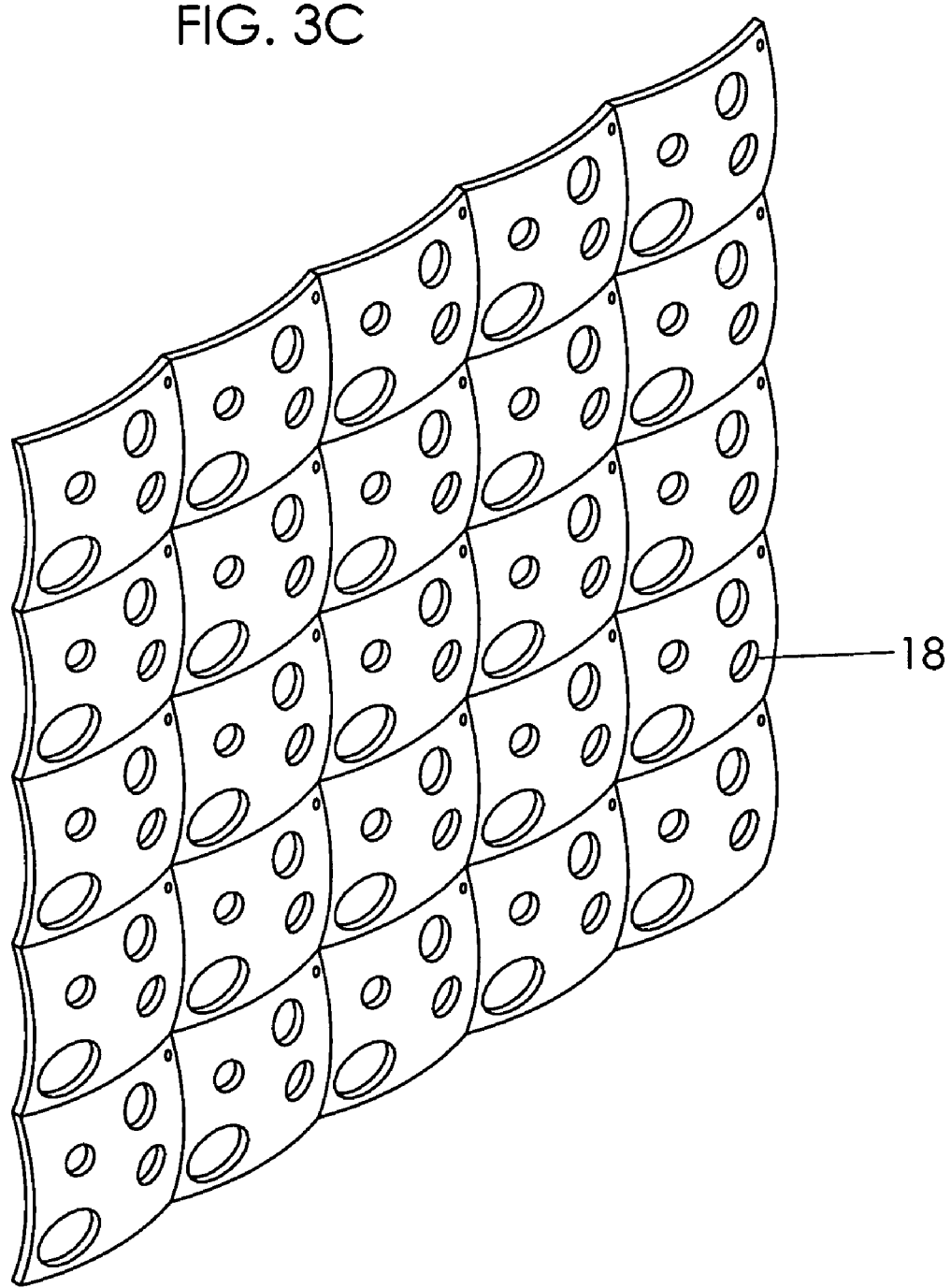
FIG. 3C shows an array of mirrorlettes in which the reflectance-modifying treatments comprise the application of holes in the mirrorlette surfaces.

FIG. 3 shows an example embodiment of the application of reflectance modifying spots 18 to selected portions of mirrorlette 12, from the front in FIG. 3A and in perspective in FIG. 3B. Each mirrorlette 12 is covered at reflectance modifying spots 18 with a mechanical modification (for example surface roughening) and/or a coating of an absorbing and/or scattering material which modifies the specular reflection of the surface of mirrorlette 12 at the point of application. The reflectance modifying spots 18 on individual mirrorlettes 12 are placed and sized in accord with conditions for producing an image when the surface is observed as an entire spatial ensemble of contributions from each mirrorlette. The spots can have various transmissivity, scatter, and color as appropriate to desired ends. Furthermore the application of reflectance modifying spots 18 can be the inverse of that shown in FIGS. 3A and 3B, such that most of the area of mirrorlette 12 is covered with reflectance modifying spots 18 and light reflects freely from only a limited area of mirrorlette 12. For purposes of this application, the term "reflectance modifying treatment" encompasses the application of reflectance modifying material as well as alteration of the surface of the curved specular reflector in other ways to reduce or eliminate specular reflectance. These include alteration of the surface by roughening, curvature change, or holes, to name a few non-limiting examples. FIG. 3C shows an array of mirrorlettes in which the reflectance-modifying treatments 18 comprise the application of holes in the mirrorlette surfaces.

Figure 3D:
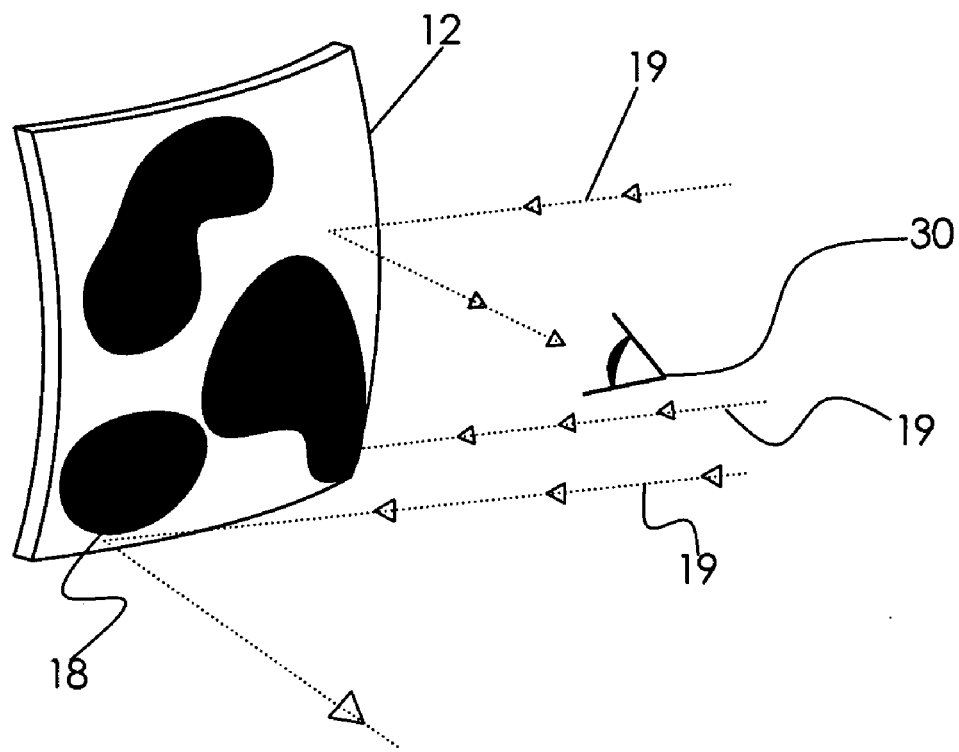
FIG. 3D depicts an individual mirrorlette in perspective showing the effect of a modifying spot that negates reflection on impinging light.

FIG. 3D depicts the spatially selective reflection process that produces an image. In this example dark reflectance spots 18 are light absorbers. The impinging rays 19 of light or other beamable energy strike mirrorlette 12 and, depending on the reflective properties of the region that the ray strikes, may be reflected at an observer 30 (top ray); absorbed or scattered by the reflectance modifying spots 18 (middle ray); or reflected to an area where it cannot be perceived (bottom ray). The reflectance-modifying spots 18 may be applied to an inherently specularly reflective material, as described above. Alternatively, a similar result could be achieved by starting with a material that is absorbent or diffusely reflecting or is in some other way a non-specular reflector, and the surface can be subsequently modified in areas where specular reflection is desired, for example by applying a coating or polishing the surface, to name a few non-limiting possibilities.

Figure 4:
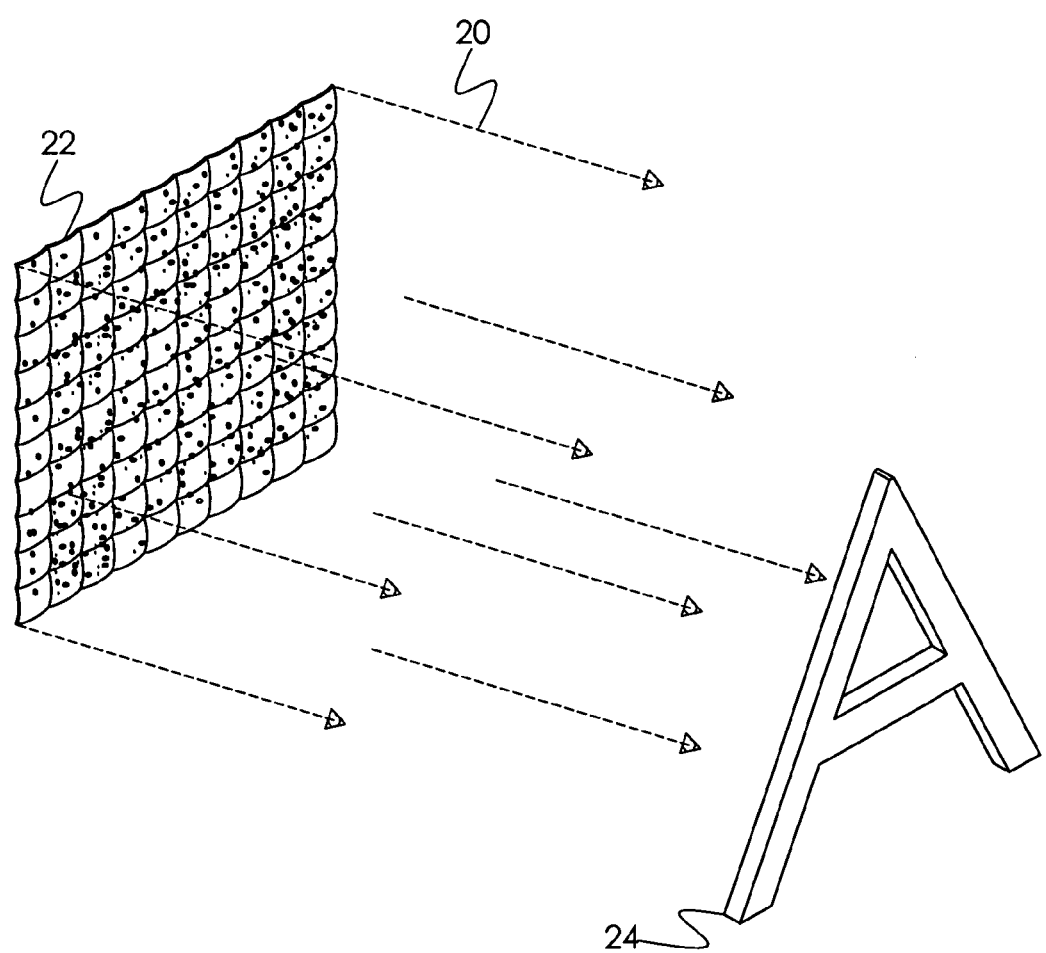
FIG. 4 depicts in perspective view the concept of how an array of mirrorlettes with reflectance modifying spots produces an image.

FIG. 4 shows how mirrorlette array 16 with applied reflectance modifying spots 18 can produce an image 24 when viewed along an image path 20. Light from a source such as the sun or a spotlight impinges on the mirrorlettes. Depending on the relative positions of the light source, the mirrorlette array, and the observer, image 24 will be formed by the light being reflected, scattered, or absorbed at the glint spots of mirrorlette array 16. The reflection, scattering, or absorption may be partial or complete and may include selective absorption of certain wavelengths to produce a multi-colored or other type of multi-spectral image.

Image 24 is thus constructed for the observer's location by covering selected glint spots with the aforementioned reflection modifying coats, or other surface reflectivity changes. The coating is applied where the desire is to obtain a darkened or colored point, or a combination of darkening and coloring. Mirrorlettes at those locations where a bright spot in the image is to be observed are left uncovered, or are covered less aggressively than the darker spots. Thus a colored and/or gray toned image can be produced from the array of curved specular reflectors.

Figure 5A:
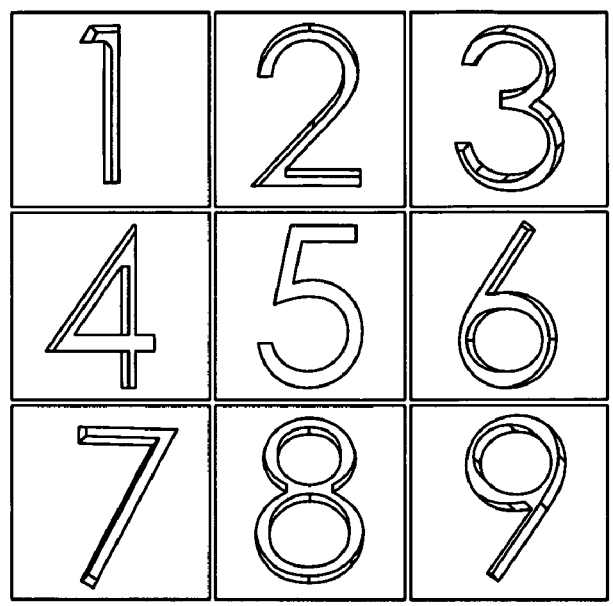
FIGS. 5A and 5B depict an individual mirrorlette divided into nine sections as viewed from the front and in perspective, respectively.
Figure 5B:
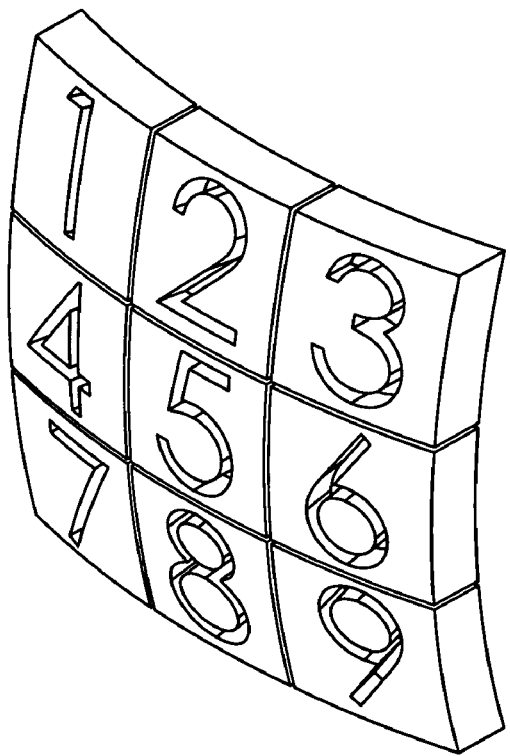

FIG. 5 illustrates an embodiment wherein a mirrorlette is divided into nine sections. Each section, as shown by number, is assigned to one of nine different images to be seen by observers under one of nine different conditions of array orientation, observer location, and light source location. The mirrorlette is shown from the front in FIG. 5A and in perspective in FIG. 5B. The numbers 1 through 9 in FIGS. 5–8 are meant to indicate different subregions of the respective mirrorlettes.

Figure 6:
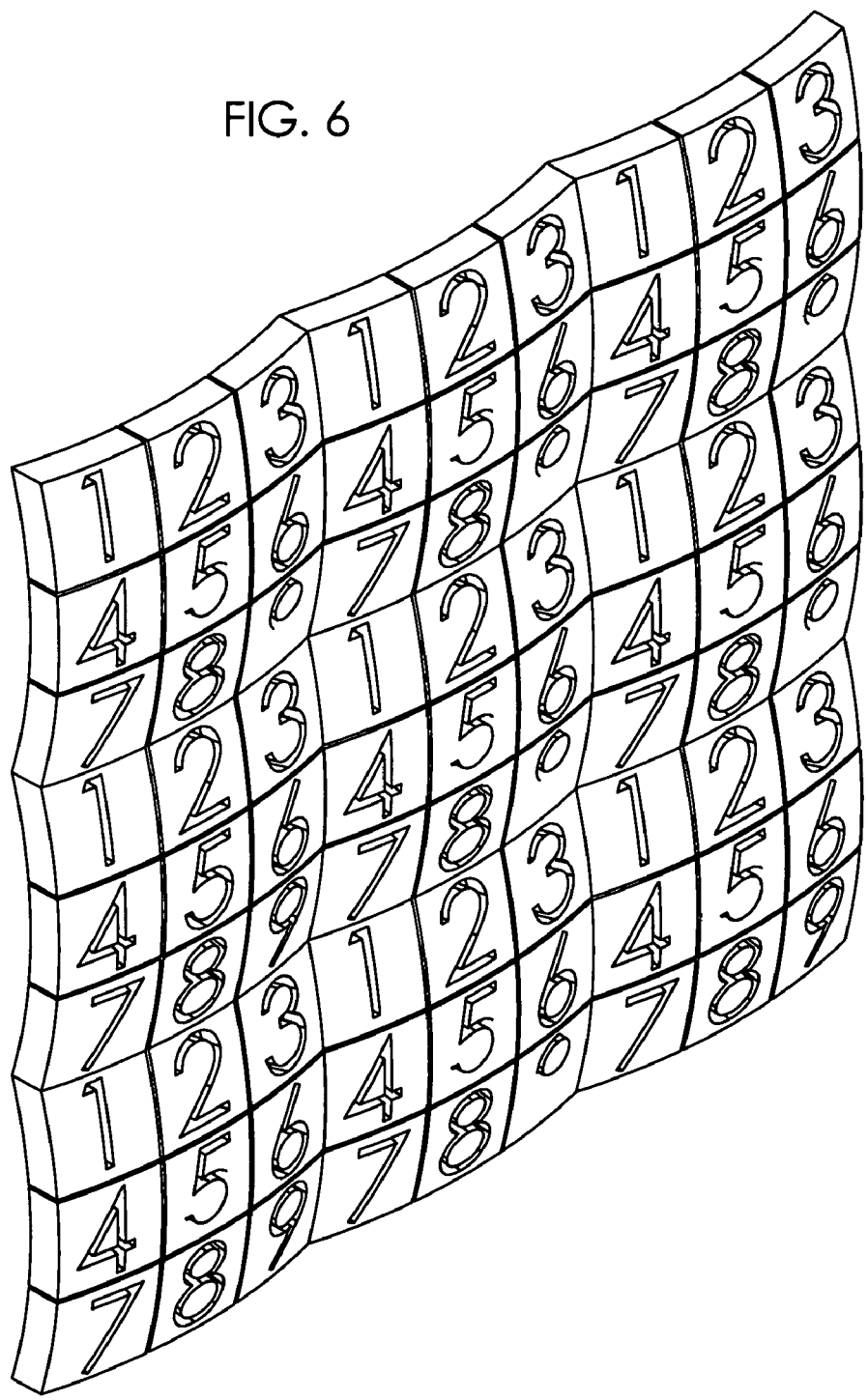
FIG. 6 depicts in perspective an array of nine mirrorlettes divided into sections.

FIG. 6 shows how several of the mirrorlettes shown in FIG. 5 can be combined into an array. In this array the locations assigned to the same numbers are locations for reflectance modifying spots that are assigned to the same image.

Figures 7A, 7B:
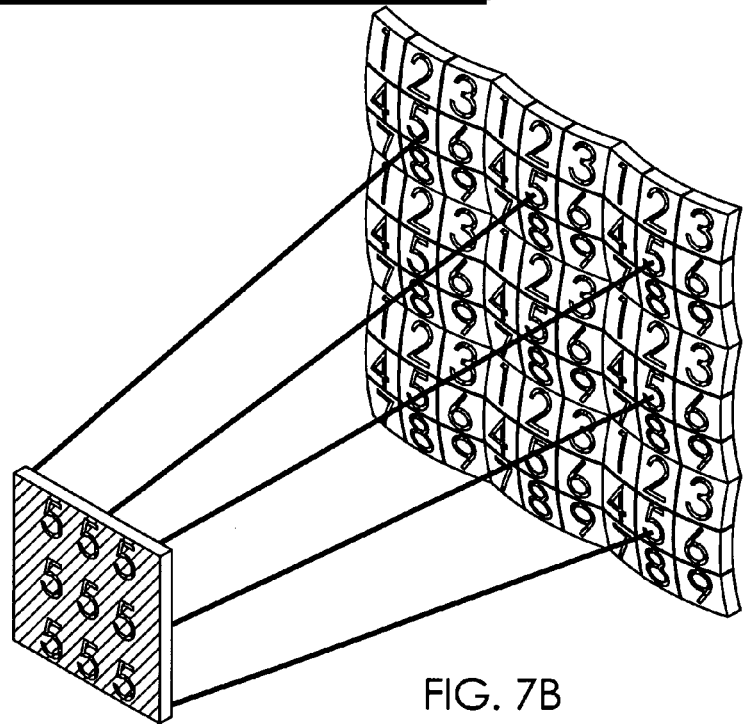
FIGS. 7A and 7B depict an array of nine mirrorlettes with designation of sections common to formation of each of nine different images, as viewed from the front and in perspective, respectively.

FIG. 7A highlights sections marked "5" on each mirrorlette. FIG. 7B shows in perspective how light striking the entire array can combine to form an image in a common direction.

Figure 8A:
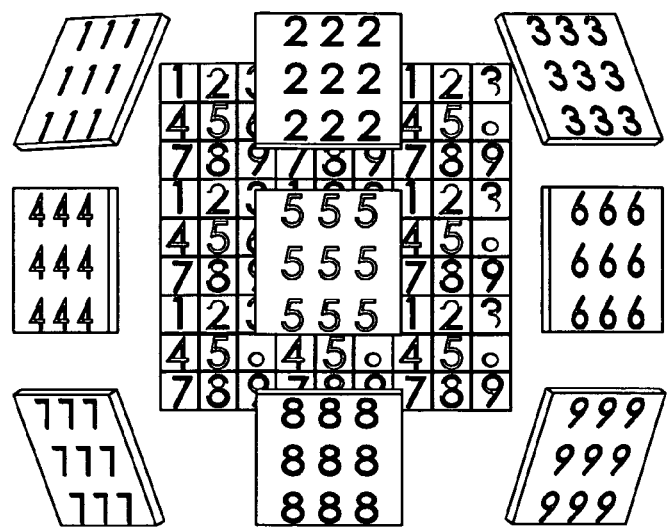
FIGS. 8A and 8B, show the mirrorlette array from the front and in perspective, respectively, depict the angular separation of nine different images.
Figure 8B:
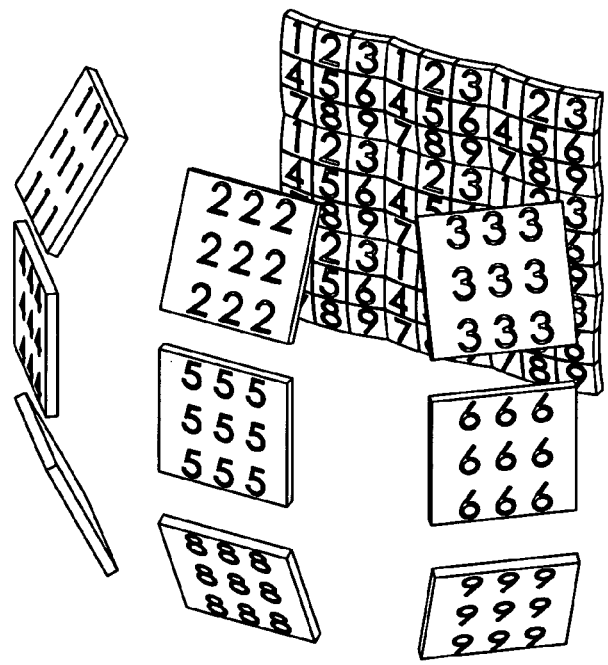

FIGS. 8A and 8B show, respectively, in front and perspective view, that each of the nine separate images will be formed in separate directions. In this case, the illumination is taken as striking the array along the normal to its surface.

Figure 9A:
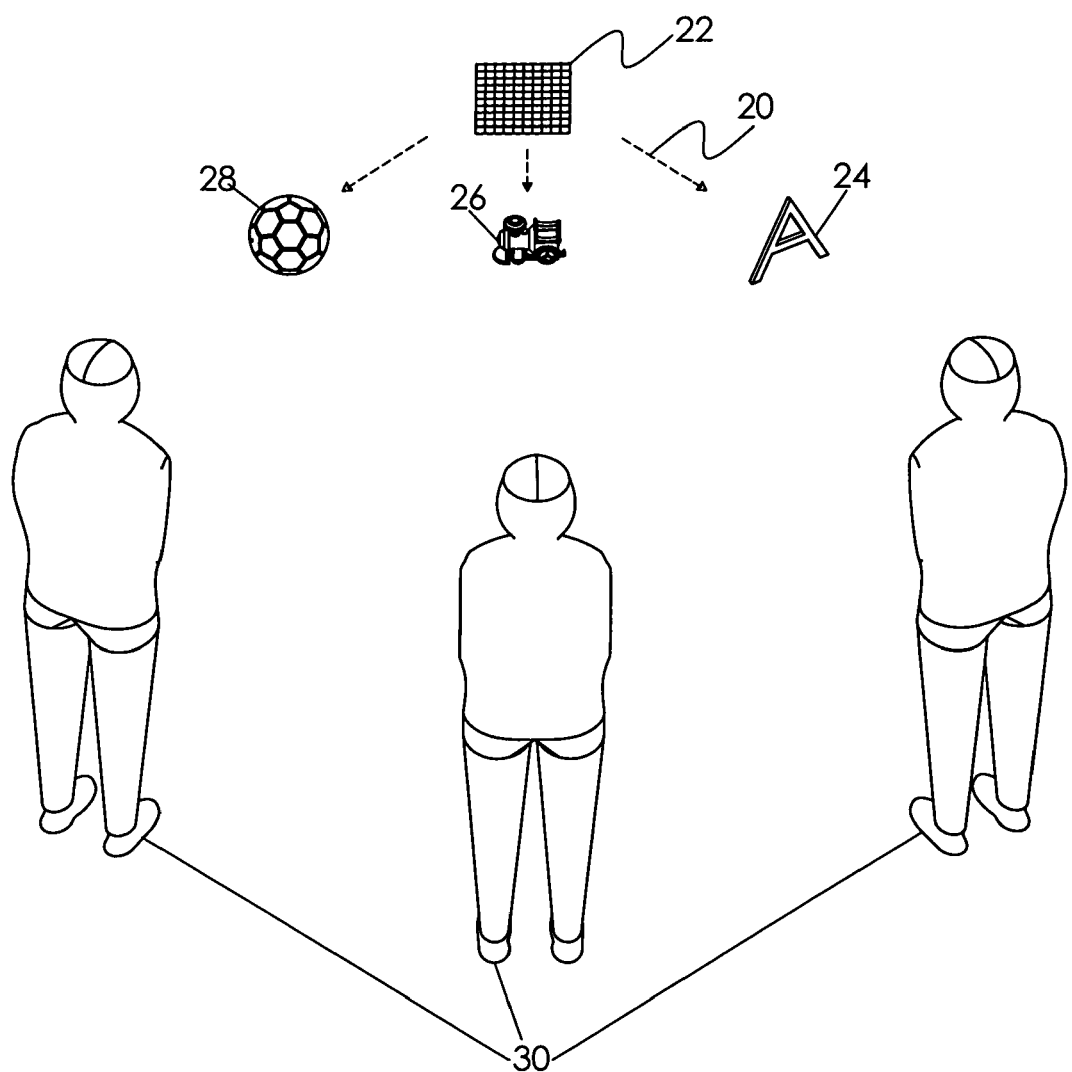
FIG. 9A depicts a mirrorlette array, an observer in three different positions relative to the array, and the three different images that the observer would see in each of the respective positions.
Figure 9B:
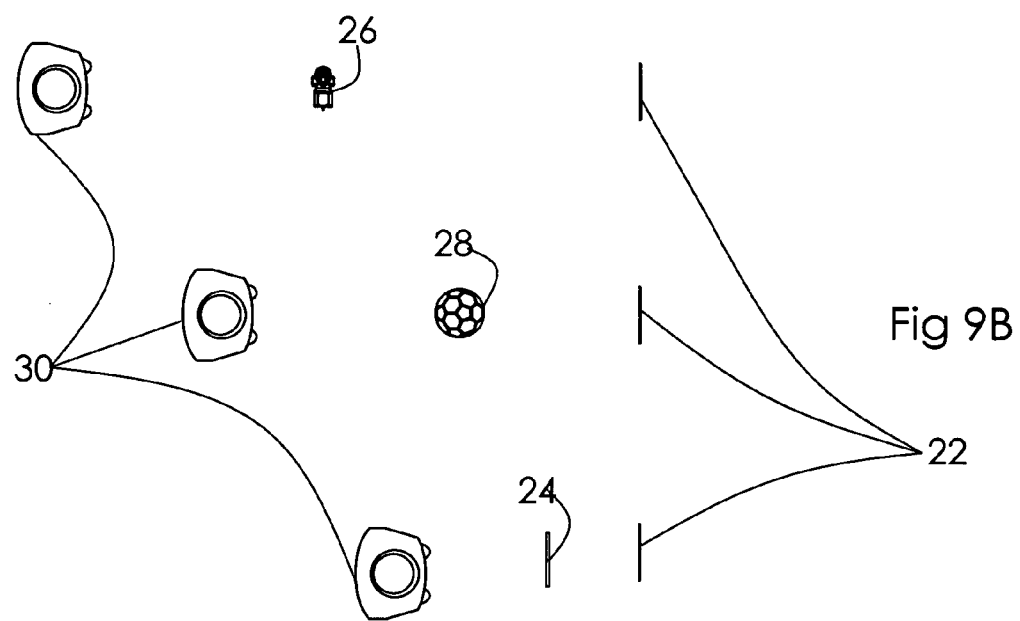
FIGS. 9B and 9C show from the top and in perspective, respectively, how the distance of an observer from a mirrorlette array can affect which of the multiple encoded images are observed.
Figure 9C:
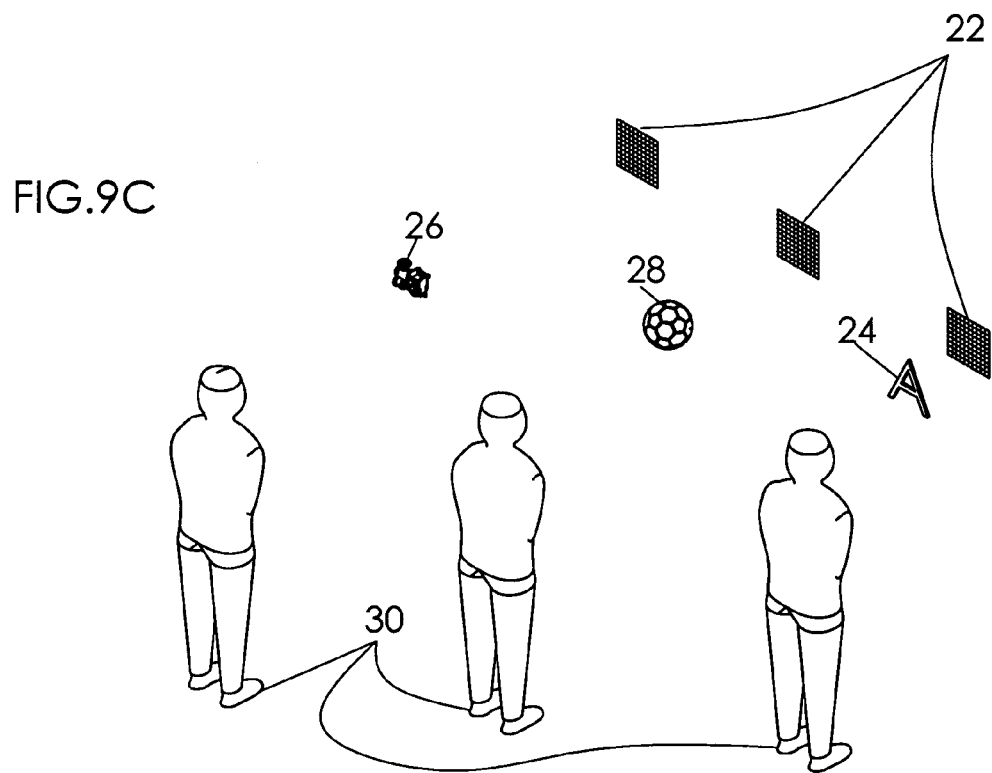

FIG. 9A shows one embodiment of how the image perceived by the observer 30 can change as the angle of observation changes relative to mirrorlette array 16. In the embodiment depicted in FIG. 9A, observer 30 perceives one of three different images 26, 28, 24, depending on whether observer 30 is viewing mirrorlette array 22 directly from the front, from slightly to the left of center, or from further to the left of center. In other embodiments of the invention the perceived image may vary as a result of viewing from anywhere in the hemisphere from which the front of mirrorlette array 16 can be observed. In still other embodiments the observer may be replaced by a non-living viewing device such as a camera or other electronic, chemical, or mechanical means of collecting the beamable energy reflected from the surface. FIGS. 9B and 9C depict how the distance of the observer from the mirrorlette array 22 can change which of the encoded images 24, 26, 28 are perceived by observer 30. FIG. 9B is viewed from the top while FIG. 9C is viewed in perspective.

Figure 9D:
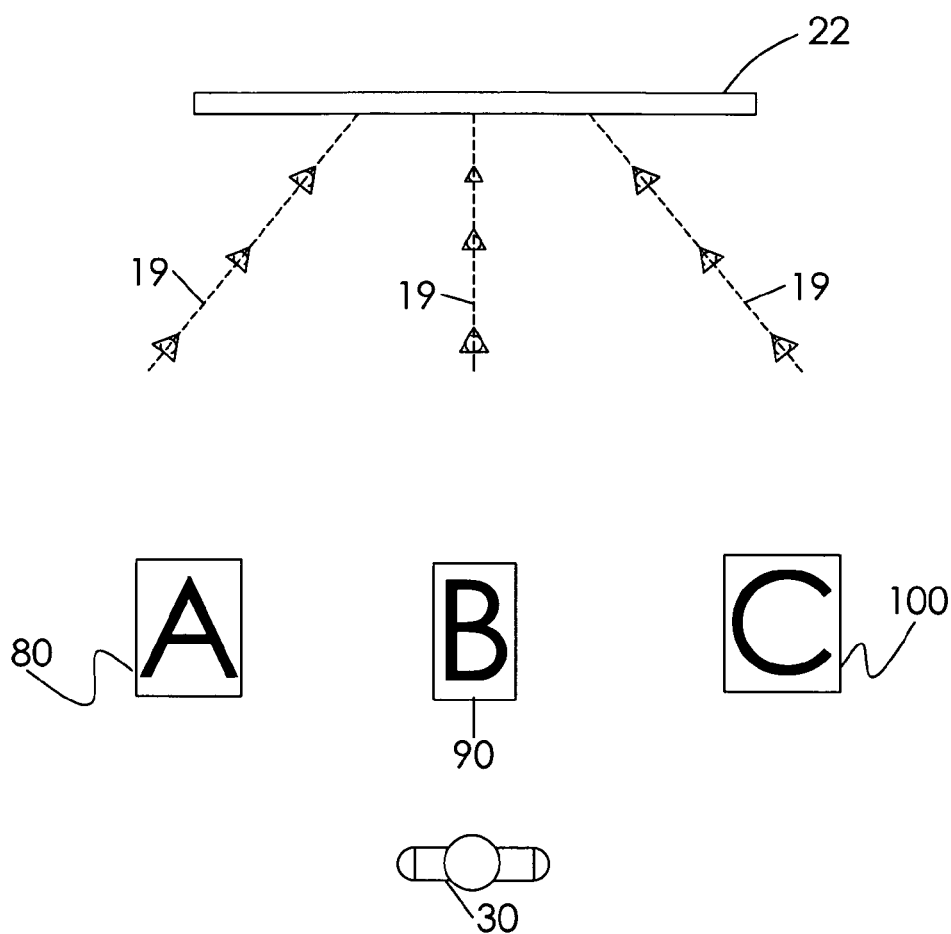
FIG. 9D shows how the angle of the impinging light relative to the mirrorlette array can affect which of the multiple encoded images are perceived by an observer that is stationary with respect to the array.

For purposes of this application the term "viewing conditions" refers to the collection of variables that determine which of the individually-addressable images can be seen on the array of curved specular reflectors. These variables include the relative angular positions of the viewer, the array, and the energy source (FIGS. 9A and 9D); the distance of the viewer from the array (FIGS. 9B and 9C); the type of energy source (e.g. acoustic or electromagnetic radiation, and the frequency or wavelength of each, respectively); and the geometry of the energy source (point source or extended source). FIG. 9D demonstrates how changing the position of the impinging beamable energy source rays 19 will affect which of several images 80, 90, 100 is perceived by observer 30. In this particular non-limiting example, depending on whether rays 19 come from the left, center, or right of the mirrorlette array 22, observer 30 will perceive one of three images 80, 90, 100 (letters 'A', 'B', or 'C', respectively), without observer 30 changing positions relative to mirrorlette array 22.

Figure 10:
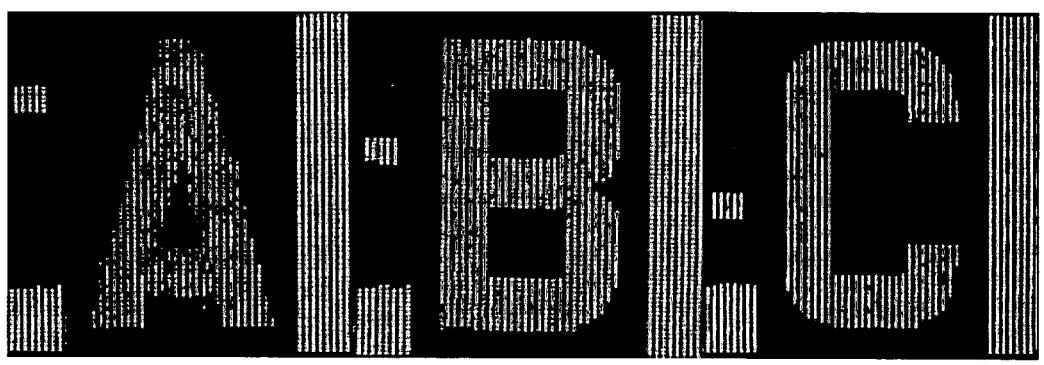
FIG. 10 shows the results of a test of one embodiment of the invention. Images of the three different letters, A, B and C, were all captured from the same mirrorlette array, using varying lighting locations to elucidate each separate letter.
Figure 11:
FIG. 11 shows a close-up of the mirrorlette array.
Figure 12:
FIG. 12 shows the lighted mirrorlette compared to a sheet of white paper to demonstrate the difference in brightness between specular reflection and diffuse reflection.

FIGS. 10, 11, and 12 show the results of a test of one embodiment of the invention. FIG. 10 shows an example of the invention. This is the result of an actual experiment using a preferred embodiment of the invention using rectangular mirrorlettes. The three letters A, B, and C have been encoded onto an array of spotted mirrorlettes in the same rectangular area used to form a pixel of the letter's image. Each letter appears by itself as the array is sequentially illuminated by three lights at different locations. In order to display the three individual letters in this figure, a digital electronic image was taken as the letters were sequenced, the camera remaining in the same location relative to the mirrorlette array for all three images. The images are then displayed beside one another in the appropriate sequence. The letters shown are all contained on the same mirrorlette array, but the array is electronically imaged under varying viewing conditions in order to display each individual letter, as described above.

FIG. 11 shows a close-up portion of an array of mirrorlettes that has been encoded to display three different letters. The reflectance-modifying spots can be discerned on each individual mirrorlette cell in accord with that cell's contribution to the overall image. The reflectance-modifying treatments in this case were applied in vertical bands using colored markers to generate different colored letters when viewed from different angles relative to the array, with flat black paint applied to cover regions for which a black background was desired.

FIG. 12 shows a piece of very white paper, with the letter 'B' printed on it (left), placed beside an illuminated mirrorlette array illuminated so as to display the letter 'B' (right) to demonstrate the brightness of the mirrorlettes' specular reflection as compared to the diffuse reflection of the white paper, thereby illustrating the fact that spatial gain can be obtained with the cells. The fact that the mirrorlettes are far brighter than the white paper is apparent. However, the true magnitude of the difference is much understated because each mirrorlette making up the letters is so bright that the video camera saturates. That is, the limited dynamic range of the video camera cannot simultaneously capture the full brightness of the mirrorlettes' specular reflection alongside the diffuse reflection from the white paper. In fact, the intensity difference between the experimental mirrorlette surface and the bright white paper is much more pronounced when viewed with the eye.

Figure 13:
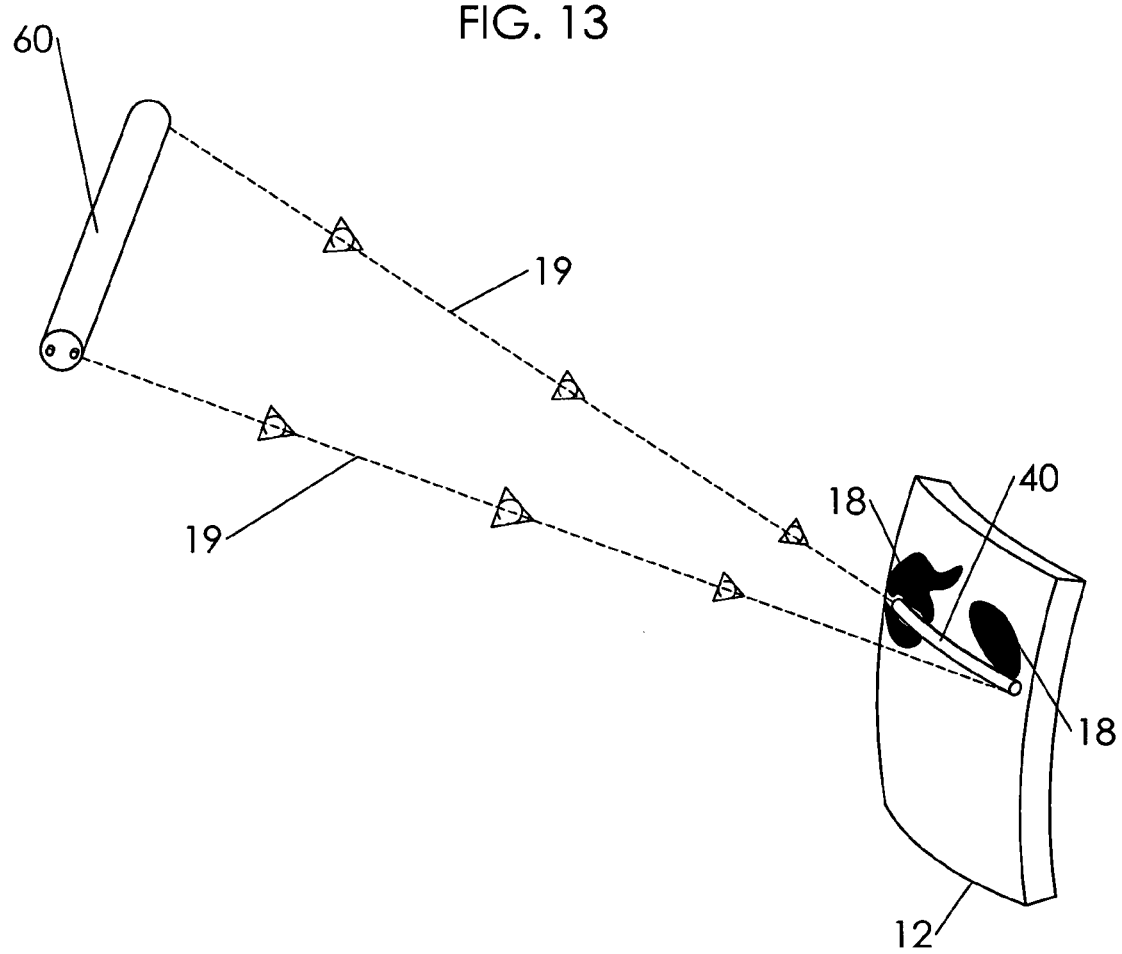
FIG. 13 shows how a larger glint spot is formed on a mirrorlette by an extended source.

FIG. 13 demonstrates how a larger glint spot 40 is formed on the surface of a mirrorlette 12 by an extended source 60, such as a fluorescent light tube. Impinging rays 19 form a broader glint spot 40 on the surface of a mirrorlette 12 than do rays from a point source, thus in some cases overlapping with more than one reflectance-modifying spot 18, thereby averaging together the effects of both of the reflectance-modifying treatments.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A surface for reflecting beamable energy, comprising:
    an array of curved specular reflectors; and
    a reflectance modifying treatment applied to at least one curved specular reflector of the array such that beamable energy, from a beamable energy source, that is directed towards the array is differentially reflected by a subset of the curved specular reflectors.

2. A surface for reflecting beamable energy as in claim 1, wherein said reflectance modifying treatment is a first reflectance modifying treatment, said first treatment applied to a first region of the at least one curved specular reflector, such that beamable energy that is reflected forms a first image that is viewable primarily under a first set of viewing conditions.

3. A surface for reflecting beamable energy as in claim 2, further comprising:
a second reflectance modifying treatment, said treatment applied to a second region of at least one curved specular reflector, such that beamable energy that is reflected forms a second image that is viewable primarily under a second set of viewing conditions, different from the first.

4. A surface for reflecting beamable energy as in claim 1, wherein the array of curved specular reflectors is substantially planar.

5. A surface for reflecting beamable energy as in claim 1, wherein the array of curved specular reflectors is substantially convex.

6. A surface for reflecting beamable energy as in claim 1, wherein the array of curved specular reflectors is substantially concave.

7. A surface for reflecting beamable energy as in claim 1, wherein the curved specular reflectors are substantially convex.

8. A surface for reflecting beamable energy as in claim 1, wherein the curved specular reflectors are substantially concave.

9. A surface for reflecting beamable energy as in claim 1, wherein the beamable energy is electromagnetic radiation.

10. A surface for reflecting beamable energy as in claim 1, wherein the beamable energy is light.

11. A surface for reflecting beamable energy as in claim 1, wherein the beamable energy is radio frequency waves.

12. A surface for reflecting beamable energy as in claim 1, wherein the beamable energy is x-rays.

13. A surface for reflecting beamable energy as in claim 1, wherein the beamable energy is microwaves.

14. A surface for reflecting beamable energy as in claim 1, wherein the beamable energy is sunlight.

15. A surface for reflecting beamable energy as in claim 1, wherein the beamable energy is an artificial light source.

16. A surface for reflecting beamable energy as in claim 15, wherein the artificial light source is collimated.

17. A surface for reflecting beamable energy as in claim 1, wherein the beamable energy is an acoustic source.

18. A surface for reflecting beamable energy as in claim 1, wherein the beamable energy is ultrasound.

19. A surface for reflecting beamable energy as in claim 1, wherein the perimeters of said curved specular reflectors are approximately rectangular.

20. A surface for reflecting beamable energy as in claim 1, wherein the perimeters of said curved specular reflectors are approximately hexagonal.

21. A surface for reflecting beamable energy as in claim 1, wherein the perimeters of said curved specular reflectors are approximately triangular.

22. A surface for reflecting beamable energy as in claim 1, wherein the surfaces of said curved specular reflectors are substantially spherical in profile.

23. A surface for reflecting beamable energy as in claim 1, wherein the surfaces of said curved specular reflectors are substantially oval in profile.

24. A surface for reflecting beamable energy as in claim 1, wherein the reflected beamable energy forms an image.

25. A surface for reflecting beamable energy as in claim 24, wherein the image is viewable only from a limited angle relative to the array of curved specular reflectors.

26. A method of producing an image from a reflective surface, comprising:
forming an array of curved specular reflectors;
applying reflection modifying treatment to a region of at least one of the curved specular reflectors, such that applied beamable energy from a beamable energy source is differentially reflected by a subset of the curved specular reflectors; and
directing a source of beamable energy at the array of curved specular reflectors such that an observer can perceive an image encoded on the array of curved specular reflectors.

27. A method of producing an image from a reflective surface as in claim 26, such that the curved specular reflectors are substantially convex.

28. A method of producing an image from a reflective surface as in claim 26, further comprising:
arranging the array of curved specular reflectors into a substantially planar configuration.

29. A method of producing an image from a reflective surface as in claim 26, such that the beamable energy is electromagnetic radiation.

30. A method of producing an image from a reflective surface as in claim 26, such that the beamable energy is visible light.

31. A surface containing a plurality of individually-addressable encoded images, comprising:
an array of curved specular reflectors;
reflectance modifying treatment applied to first regions of a first subset of the curved specular reflectors, such that beamable energy from a beamable energy source that is directed towards the array is differentially reflected from the array of curved specular reflectors, said differential reflectance being viewable primarily under a first set of viewing conditions; and
reflectance modifying treatment applied to second regions of a second subset of the curved specular reflectors, such that beamable energy that is directed towards the array is differentially reflected from the array of curved specular reflectors, said differential reflectance being viewable primarily under a second set of viewing conditions.

32. A surface containing a plurality of individually-addressable encoded images as in claim 31, wherein the reflectance modifying treatment comprises roughening.

33. A surface containing a plurality of individually-addressable encoded images as in claim 31, wherein the first or second set of viewing conditions comprise distance of an observer from the array of curved specular reflectors.

34. A surface containing a plurality of individually-addressable encoded images as in claim 31, wherein the first or second set of viewing conditions comprise an angle between the beamable energy and the array of curved specular reflectors.

35. A surface containing a plurality of individually-addressable encoded images as in claim 31, wherein the first or second set of viewing conditions comprise an angle between an observer and the array of curved specular reflectors.

36. A surface containing a plurality of individually-addressable encoded images as in claim 31, wherein the beamable energy is emitted from an extended source.

37. A surface for reflecting beamable energy, comprising:
an array of non-overlapping curved specular reflectors; and reflectance-modifying treatment applied to at least one curved reflector, such that incident light is specularly reflected from at least one of said reflectance-modifying treated curved specular reflectors.

38. A method of producing an image from a reflective surface, comprising:
forming an array of curved specular reflectors;
applying reflection modifying treatment to a region of at least one of the curved specular reflectors, such that applied ultrasound energy is differentially reflected by a subset of the curved specular reflectors; and
directing a source of ultrasound energy at the array of curved specular reflectors such that an observer can perceive an image encoded on the array of curved specular reflectors.

39. A surface containing a plurality of individually-addressable encoded images, comprising:
an array of curved specular reflectors; and
reflectance modifying treatment applied to first regions of a first subset of the curved specular reflectors, such that beamable energy that is directed towards the array is differentially reflected from the array of curved specular reflectors, said differential reflectance being viewable primarily under a first set of viewing conditions;
wherein the reflectance modifying treatment is selected from the group consisting of: an applied reflectance modifying material and producing holes.

40. A surface containing a plurality of individually addressable encoded images as in claim 39, wherein said reflectance modifying treatment is further applied to second regions of a second subset of the curved specular reflectors, such that beamable energy that is directed towards the array is differentially reflected from the array of curved specular reflectors, said differential reflectance being viewable primarily under a second set of viewing conditions.

41. A surface containing a plurality of individually-addressable encoded images, comprising:
an array of curved specular reflectors; and
reflectance modifying treatment applied to first regions of a first subset of the curved specular reflectors, such that beamable energy that is directed towards the array is differentially reflected from the array of curved specular reflectors, said differential reflectance being viewable primarily under a first set of viewing conditions;
wherein the beamable energy is emitted from the sun.

42. A surface containing a plurality of individually addressable encoded images as in claim 41, further comprising:
reflectance modifying treatment applied to second regions of a second subset of the curved specular reflectors, such that beamable energy emitted from an extended source that is directed towards the array is differentially reflected from the array of curved specular reflectors, said differential reflectance being viewable primarily under a second set of viewing conditions.

43. A surface containing a plurality of individually-addressable encoded images, comprising:
an array of curved specular reflectors; and
reflectance modifying treatment applied to first regions of a first subset of the curved specular reflectors, such that substantially collimated beamable energy that is directed towards the array is differentially reflected from the array of curved specular reflectors, said differential reflectance being viewable primarily under a first set of viewing conditions.

44. A surface containing a plurality of individually addressable encoded images as in claim 43, further comprising:
reflectance modifying treatment applied to second regions of a second subset of the curved specular reflectors, such that substantially collimated beamable energy that is directed towards the array is differentially reflected from the array of curved specular reflectors, said differential reflectance being viewable primarily under a second set of viewing conditions.

45. A surface containing a plurality of individually-addressable encoded images, comprising:
an array of curved specular reflectors; and
a reflectance modifying material applied to first regions of a first subset of the curved specular reflectors, such that beamable energy that is directed towards the array is differentially reflected from the array of curved specular reflectors, said differential reflectance being viewable primarily under a first set of viewing conditions.

46. A surface containing a plurality of individually addressable encoded images as in claim 45, further comprising:
a reflectance modifying material applied to second regions of a second subset of the curved specular reflectors, such that beamable energy that is directed towards the array is differentially reflected from the array of curved specular reflectors, said differential reflectance being viewable primarily under a second set of viewing conditions.

47. A surface containing a plurality of individually addressable encoded images as in claim 46 wherein the perimeters of said curved specular reflectors are approximately rectangular.

48. A surface containing a plurality of individually addressable encoded images as in claim 47 wherein said beamable energy is light.

49. A surface for reflecting beamable energy, comprising:
an array of substantially opaque curved specular reflectors; and
a reflectance modifying treatment applied to at least one curved specular reflector, such that beamable energy that is directed towards the array is differentially reflected by a subset of the curved specular reflectors.

50. A surface for reflecting beamable energy, comprising:
an array of curved specular reflectors, each reflector comprising a reflective surface surrounded by a perimeter, wherein said perimeters are disposed laterally adjacent one another; and
a reflectance modifying treatment applied to the reflective surface of at least one curved specular reflector, such that beamable energy that is directed towards the array is differentially reflected by a subset of the curved specular reflectors.

51. A surface for reflecting beamable energy, comprising:
a matrix of curved specular reflectors; and
a reflectance modifying treatment applied to at least one curved specular reflector, such that beamable energy that is directed towards the matrix is differentially reflected by a subset of the curved specular reflectors.

* * * * *